No. 848,511. PATENTED MAR. 26, 1907.
H. R. TOOKER.
EMERGENCY STOP MECHANISM.
APPLICATION FILED SEPT. 17, 1906.

2 SHEETS—SHEET 1.

H. R. Tooker, Inventor

Witnesses
Jas. K. McCathran
B. G. Foster

By C. G. Siggers
Attorney

THE NORRIS PETERS CO., WASHINGTON, D. C.

No. 848,511. PATENTED MAR. 26, 1907.
H. R. TOOKER.
EMERGENCY STOP MECHANISM.
APPLICATION FILED SEPT. 17, 1906.
2 SHEETS—SHEET 2.
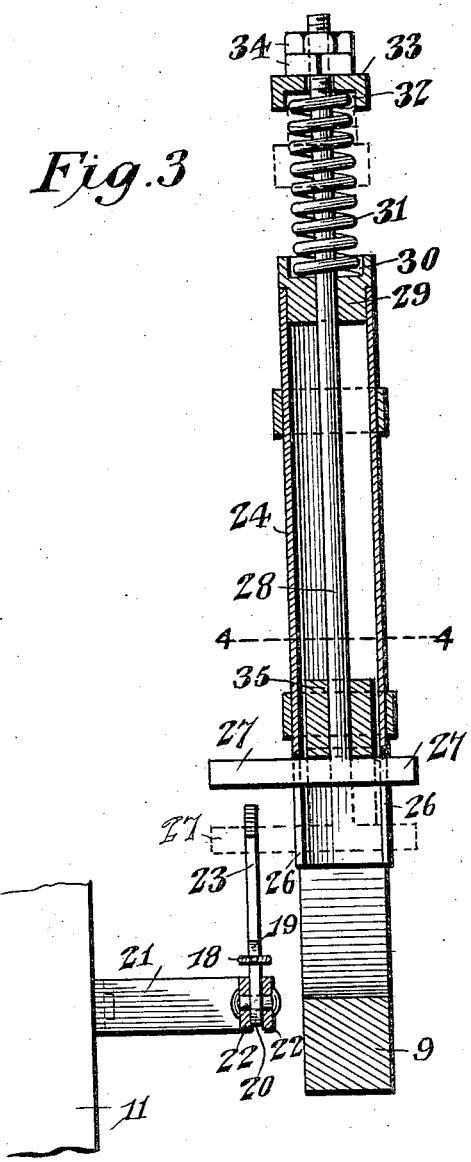
Fig. 3.
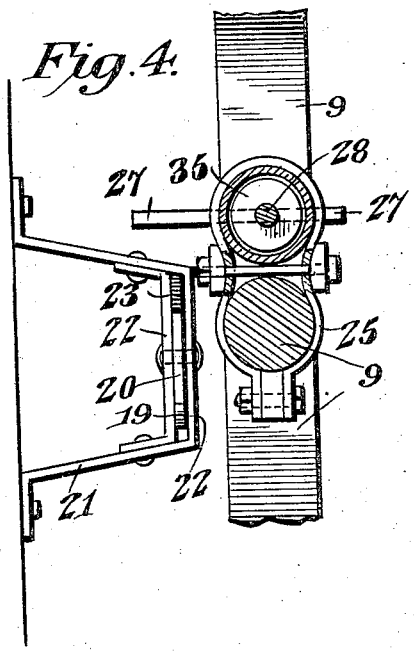
Fig. 4.
Fig. 5.
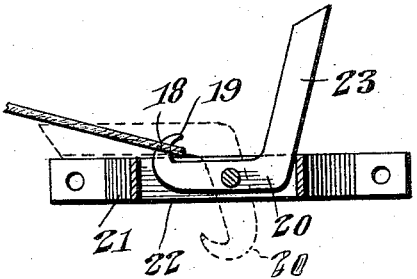
H. R. Tooker, Inventor
Witnesses

UNITED STATES PATENT OFFICE.

HUGH ROSS TOOKER, OF OILCENTER, CALIFORNIA.

EMERGENCY STOP MECHANISM.

No. 848,511.

Specification of Letters Patent.

Patented March 26, 1907.

Application filed September 17, 1906. Serial No. 334,976.

*To all whom it may concern:*

Be it known that I, HUGH ROSS TOOKER, a citizen of the United States, residing at Oilcenter, in the county of Kern and State of California, have invented a new and useful Emergency Engine Stop Mechanism, of which the following is a specification.

The constant presence of an engineer at an engine is frequently impracticable, and therefore it is often the custom to permit an engine to run for a considerable period without supervision. It sometimes happens, therefore, that the breakage of a belt, the variation of the load, or some other occurrence of a similar nature frees the engine so as to permit it to race, and thereby injure itself.

The principal object of the present invention is to provide novel means of a simple nature which will automatically cut off the supply of motive fluid to an engine, and thereby stop the same whenever its speed becomes excessive from any cause.

While the embodiment of the invention herein disclosed is shown in connection with a steam-engine, it will be understood that said invention is not limited to such use, but may be employed with engines of other types.

Figure 1:
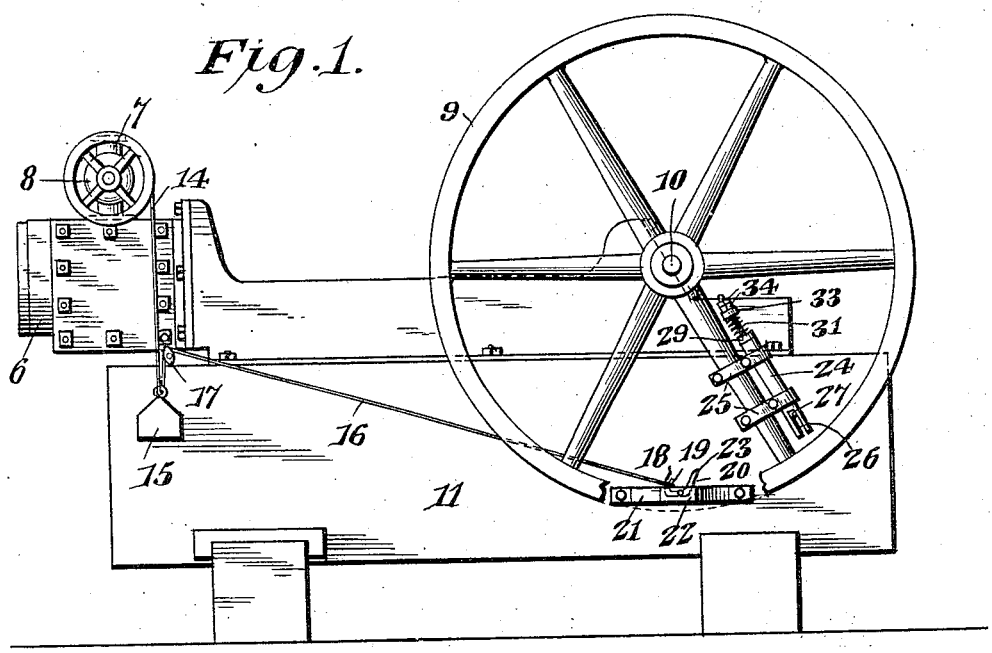
Figure 2:
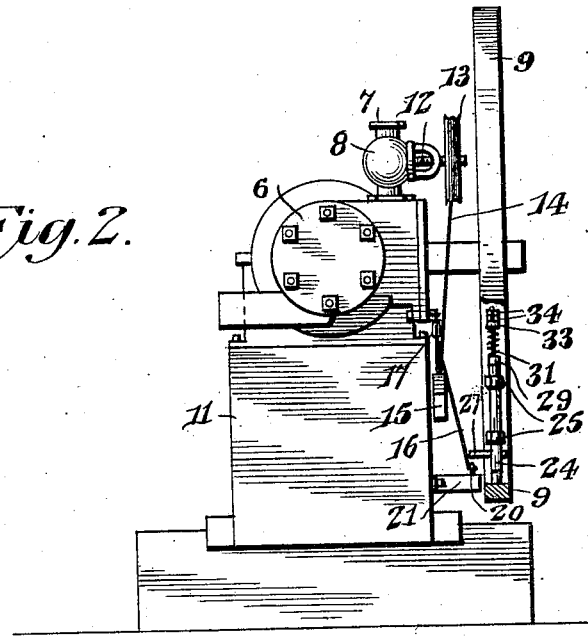

In the accompanying drawings, Figure 1 is a side elevation of an engine, showing the improved mechanism applied thereto. Fig. 2 is a rear elevation of the same. Fig. 3 is a detail vertical sectional view on an enlarged scale. Fig. 4 is a cross-sectional view on the line 4 4 of Fig. 3. Fig. 5 is a detail view of the hook and its mounting.

Similar reference-numerals designate corresponding parts in all the figures of the drawings.

The engine, which, as already stated, may be of any desired type, in the form disclosed comprises a cylinder 6 and the motive-fluid supply, which is conducted through a pipe 7, having a controlling-valve 8 therein. A flywheel 9 is mounted on the engine-shaft 10. This engine is supported on a suitable bed or base, (designated as a whole by the reference-numeral 11.) The controlling-valve 8 includes a threaded stem 12, on which is mounted a pulley 13, and a cable 14, wrapped upon the pulley, is connected to a suitable motor. In the present form of construction this motor consists of a weight 15, attached to the lower end of the cable, and thus when the weight moves downwardly the pulley 13 will be revolved, so that the valve will be moved to closed position. Under normal conditions, however, this motor is held against movement, and for this purpose a cable 16 has one end secured to the weight, said cable passing over a pulley 17, arranged above the weight and having a loop or link 18 at its other end, that detachably engages the upstanding terminal bill 19 of a hook 20. This hook is mounted between its ends in a bracket 21, secured to the engine-bed and disposed inside the lower portion of the flywheel 9. As clearly shown in Figs. 4 and 5, the said hook is pivoted between a pair of plates 22, connecting the outer ends of the arms of the bracket 21. The terminal portion of the hook opposite that which is formed into the bill 19 projects upwardly and constitutes a finger 23.

A carrier in the form of a tubular casing 24 is disposed alongside one of the spokes of the fly-wheel 9, and spoke-embracing clamps 25 surround said spoke and the casing, so as to effectively secure the latter to the former. The outer end of the casing is slotted, as shown at 26, and slidably mounted in the slots is a cross-head 27, carried by the outer end of a stem 28, that extends longitudinally through the casing and is slidable therein. The inner end of the cross-head is movable outwardly, so that it will engage the finger 23 of the hook 20. The inner end of the casing 24 is closed by a plug 29, through which the stem 28 passes, said plug having a recessed seat 30 in its outer end. A coiled spring 31, surrounding the inner projecting end of the stem 28, has one end engaged in the seat 30, while its other end is engaged in a recessed seat 32, formed in a bearing-washer 33, that is slidably mounted on the stem. Adjusting and holding nuts 34, threaded on the inner end of the stem, serve to maintain the washer 33 in different positions upon the said stem. A weight 35, loosely mounted in the casing 24 upon the stem 28, bears against the cross-head 27.

The operation of the structure may be briefly described as follows: Under normal conditions the loop 18 of the cable 16 is engaged with the bill 19 of the hook 20, thus maintaining the finger 23 in an upstanding position. The spring 31 serves to hold the stem 28, and consequently the cross-head 27, in their innermost positions, and when so placed the path of movement of the cross-head 27 is not intersected by the finger 23. The tension of the spring 31 can of course be varied by adjusting the nuts 34. As long as the engine runs under ordinary speed, therefore, the parts will be maintained in the positions shown in the drawings; but if the speed becomes excessive the weight 35 will cause the outward movement of the cross-head and stem against the resistance of the spring 31, and the said cross-head will be carried to a position so that it will engage the finger 23. When this occurs, the hook 20 will be swung so that the bill 19 will become disengaged from the loop 18 of the cable 16. The weight-motor 15 will therefore be free and it will move downwardly, thereby rotating the pulley and cutting off the motive fluid from the engine. It will be evident that this structure is exceedingly simple, and experience has demonstrated that it is thoroughly effective for the purpose. It may be easily applied to engines of different types, as the parts are so constructed that they may be readily placed in position.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a mechanism of the character set forth, the combination with an engine, of a supply-controlling valve and a fly-wheel therefor, a motor for actuating the valve, a movable hook located adjacent to the fly-wheel, a device movable with the motor and detachably engaged with the hook for holding said motor against movement, and means mounted on the fly-wheel and movable therein to a position to engage the hook and move the same to disengage it from the device and thereby permit the operation of the motor.

2. In a mechanism of the character set forth, the combination with an engine, of a supply-controlling valve and a fly-wheel therefor, a motor for actuating the valve, a hook pivoted adjacent to the fly-wheel, a cable having a connection with the motor and detachably engaged with the hook for holding the motor against movement, and means mounted on the fly-wheel and movable thereon to a position to engage the hook and move the same to positively disengage it from the cable.

3. In a mechanism of the character set forth, the combination with an engine, of a supply-controlling valve and a fly-wheel therefor, a pulley mounted on the valve, a weight having a cable connection with the pulley, a hook pivoted between its ends adjacent to the fly-wheel and having an offset finger, a cable connected to the weight and detachably engaged with the hook, and means mounted on the fly-wheel and movable to a position to engage the finger of the hook to swing said hook and thereby disengage it from the cable.

4. In mechanism of the character set forth, the combination with an engine, of a supply-controlling valve and a fly-wheel therefor, a motor for actuating the valve, means for holding the motor against movement, and means mounted on the fly-wheel for releasing the motor, said latter means including a carrier, clamps connected to the carrier and embracing a spoke of the fly-wheel for securing said carrier to the fly-wheel, and a centrifugally-actuated operating device movably mounted on the carrier and movable to a position to coöperate with the holding means.

5. In a mechanism of the character set forth, the combination with an engine, of a supply-controlling valve and a fly-wheel therefor, a motor for actuating the supply-controlling valve, means for holding the motor against movement, mechanism mounted on the fly-wheel for releasing the motor, said mechanism comprising a casing, spoke-embracing clamps for securing the casing to the spoke of the fly-wheel, a stem slidably mounted in the casing and projecting beyond the opposite ends thereof, the outer end of the said stem having a cross-head that engages the holding means, a weight mounted on the stem within the casing, and a spring mounted on the inner projecting end of the stem and bearing against the casing.

6. In a mechanism of the character set forth, the combination with an engine, of a supply-controlling valve and a fly-wheel therefor, a pulley mounted on the supply-controlling valve, a weight-motor having a cable connection with the pulley, a hook pivoted between its ends adjacent to the fly-wheel, said hook having an offset terminal bill and an offset terminal finger, a cable connected to the weight-motor and detachably engaged with the offset terminal bill, a tubular casing, spoke-embracing clamps securing the casing to a spoke of the fly-wheel, a stem slidably mounted in the casing and having a cross-head at its outer end that is movable into and out of engagement with the finger of the hook to swing said hook and disengage the bill thereof from the cable, a weight mounted on the stem, a spring bearing against the inner end of the casing and surrounding the stem, and means mounted on the inner end of the stem and bearing against the spring, said means being adjustable to vary the tension of the said spring.

7. In mechanism of the character set forth, the combination with an engine, of a supply-controlling valve and a fly-wheel therefor, a motor for actuating the valve, a hook pivoted between its ends, a cable having a connection with the motor and detachably engaged with one end of the hook for holding the motor against movement, and means mounted on the fly-wheel and movable thereon to a position to engage the other end of the hook to swing said hook and disengage it from the cable in order to permit the motor to operate.

8. In mechanism of the character described, the combination with an engine, of a supply-controlling valve and a fly-wheel therefor, a motor for actuating the valve, a bracket having a pair of spaced plates, a hook pivoted to and between the plates, a device for holding the motor against movement, said device having a detachable engagement with the hook, and means mounted on the fly-wheel and movable thereon to a position to engage said hook to swing the same and positively disengage it from the holding device in order to permit the motor to operate.

9. In mechanism of the character described, the combination with an engine, of a supply-controlling valve and a fly-wheel therefor, a motor for actuating the valve, means for holding the motor against movement, and means mounted on the fly-wheel for releasing the motor, said releasing means comprising a casing secured to the fly-wheel, a centrifugally-operating stem slidably mounted within the casing and having an exposed cross-head that coöperates with the holding means, and means for resisting the centrifugal action of the stem and cross-head.

10. In mechanism of the character described, the combination with an engine, of a supply-controlling valve and a fly-wheel therefor, a motor for actuating the valve, means for holding the motor against movement, and means mounted on the fly-wheel for releasing the motor, said releasing means comprising a casing, a spoke-embracing clamp carried by the casing and engaging a spoke of the fly-wheel to secure the same thereon, and a centrifugally-actuated operating device mounted in the casing and including a head projecting therefrom and movable to a position to engage the holding means.

In testimony that I claim the foregoing as my own I have hereto affixed my signature in the presence of two witnesses.

HUGH ROSS TOOKER.

Witnesses:
F. A. FETHER,
J. D. JONES.